(12) United States Patent
Caldara

(10) Patent No.: US 7,436,815 B2
(45) Date of Patent: Oct. 14, 2008

(54) SWITCHING SYSTEM AND METHOD HAVING LOW, DETERMINISTIC LATENCY

(75) Inventor: Stephen A Caldara, Sudbury, MA (US)

(73) Assignee: Telica, Inc., Marlboro, MA (US)

( * ) Notice: Subject to any disclaimer, the term of this patent is extended or adjusted under 35 U.S.C. 154(b) by 1294 days.

(21) Appl. No.: 09/790,820

(22) Filed: Feb. 22, 2001

(65) Prior Publication Data
US 2001/0033572 A1 Oct. 25, 2001

Related U.S. Application Data

(60) Provisional application No. 60/185,011, filed on Feb. 25, 2000.

(51) Int. Cl.
*H04L 12/66* (2006.01)
(52) U.S. Cl. .................. 370/352; 370/465; 370/466; 370/395.61; 370/395.65
(58) Field of Classification Search .......... 370/905, 370/352, 347, 907, 465, 466, 395.61, 395.65
See application file for complete search history.

(56) References Cited

U.S. PATENT DOCUMENTS

| | | | |
|---|---|---|---|
| 4,896,266 A * | 1/1990 | Klashka et al. ........ | 710/45 |
| 5,509,007 A | 4/1996 | Takashima et al. | |
| 5,513,174 A | 4/1996 | Punj | |
| 5,748,629 A | 5/1998 | Caldara et al. | |
| 5,781,533 A | 7/1998 | Manning et al. | |
| 5,787,086 A | 7/1998 | McClure et al. | |
| 5,790,770 A | 8/1998 | McClure et al. | |
| 5,822,540 A | 10/1998 | Caldara et al. | |
| 5,850,395 A | 12/1998 | Hauser et al. | |
| 5,862,137 A | 1/1999 | Manning et al. | |
| 5,867,663 A | 2/1999 | McClure et al. | |

(Continued)

FOREIGN PATENT DOCUMENTS

WO    WO 95/17789    6/1995

OTHER PUBLICATIONS

Tsai, Zsehong et al., "Performance Analysis of Two Echo Control Designs in ATM Networks", IEEE/ACM Transactions on Networking, US, IEEE, Inc. New York ; vol. 2; ISSN: 1063-6692 (1994).

(Continued)

*Primary Examiner*—Edan Orgad
*Assistant Examiner*—Andrew C Lee

(57) ABSTRACT

A system and method of switching information in a time division multiplexed (TDM) communications network are described. The TDM time slots correspond to channels of circuit information. A circuit interface receives information from the TDM communication network, extracts circuit data therefrom, and provides the extracted circuit data on an internal bus. It also receives circuit data from an internal bus and transmits the data received from the internal bus on to the TDM communications network. A switching fabric receives packets having a header and a payload in which the header includes information identifying a destination for the packet and in which the fabric transmits a received packet in accordance with the destination identification in the packet header. Adaptation logic, in response to the circuit interface, packs information from multiple circuits into a payload of a packet and schedules the delivery of such a packet to the fabric. The adaptation logic receives packets from the switching fabric; and merges circuit data from multiple packets onto an identified channel.

22 Claims, 16 Drawing Sheets

U.S. PATENT DOCUMENTS

| | | | |
|---|---|---|---|
| 5,870,538 A | 2/1999 | Manning et al. | |
| 5,872,769 A | 2/1999 | Caldara et al. | |
| 5,889,956 A | 3/1999 | Hauser et al. | |
| 5,896,511 A | 4/1999 | Manning et al. | |
| 5,909,427 A | 6/1999 | Manning et al. | |
| 5,917,805 A | 6/1999 | Manning et al. | |
| 5,948,067 A | 9/1999 | Caldara et al. | |
| 5,956,342 A | 9/1999 | Manning et al. | |
| 5,978,359 A | 11/1999 | Caldara et al. | |
| 5,991,270 A * | 11/1999 | Zwan et al. | 370/249 |
| 6,002,667 A | 12/1999 | Manning et al. | |
| 6,076,112 A | 6/2000 | Hauser et al. | |
| 6,088,736 A | 7/2000 | Manning et al. | |
| 6,115,748 A | 9/2000 | Hauser et al. | |
| 6,118,754 A * | 9/2000 | Sako et al. | 369/275.3 |
| 6,141,346 A | 10/2000 | Caldara et al. | |
| 6,167,452 A | 12/2000 | Manning et al. | |
| 6,195,714 B1 * | 2/2001 | Li et al. | 710/31 |
| 6,331,981 B1 * | 12/2001 | Harth et al. | 370/395.1 |
| 6,519,261 B1 * | 2/2003 | Brueckheimer et al. | 370/395.52 |
| 6,628,657 B1 * | 9/2003 | Manchester et al. | 370/395.1 |
| 6,631,130 B1 * | 10/2003 | Roy et al. | 370/352 |
| 6,636,515 B1 * | 10/2003 | Roy et al. | 370/395.1 |
| 6,646,983 B1 * | 11/2003 | Roy et al. | 370/218 |
| 6,665,495 B1 * | 12/2003 | Miles et al. | 398/54 |
| 6,735,170 B1 * | 5/2004 | Roberts | 370/230 |
| 6,754,206 B1 * | 6/2004 | Nattkemper et al. | 370/369 |
| 6,760,327 B1 * | 7/2004 | Manchester et al. | 370/364 |
| 6,801,548 B1 * | 10/2004 | Duschatko et al. | 370/537 |
| 2001/0033572 A1 * | 10/2001 | Caldara | 370/395 |
| 2003/0172189 A1 * | 9/2003 | Greenblat | 709/251 |

OTHER PUBLICATIONS

Spanke, Ron A. et al., "ATM Composite Cell Switching for DS0 Digital Switches", Symposium, Advanced Switching Technologies for Universal Telecommunications at the Beginning of the s1st. Century, Berlin, (1995), ISBN: 308007-2093-0.

Badran, Hosein F., "ATM Switch Architectures with Input-Output-Buffering: Effect of Input Traffic Correlation, Contention Resolution Policies, Buffer Allocation Strategies and Delay in Back Pressure Signal"; Computer Networks and ISDN Systems, NL, North Holland Publishing, Amsterdam, v. 26, (1994) ISSN: 0169-7552.

* cited by examiner

Figure 4:
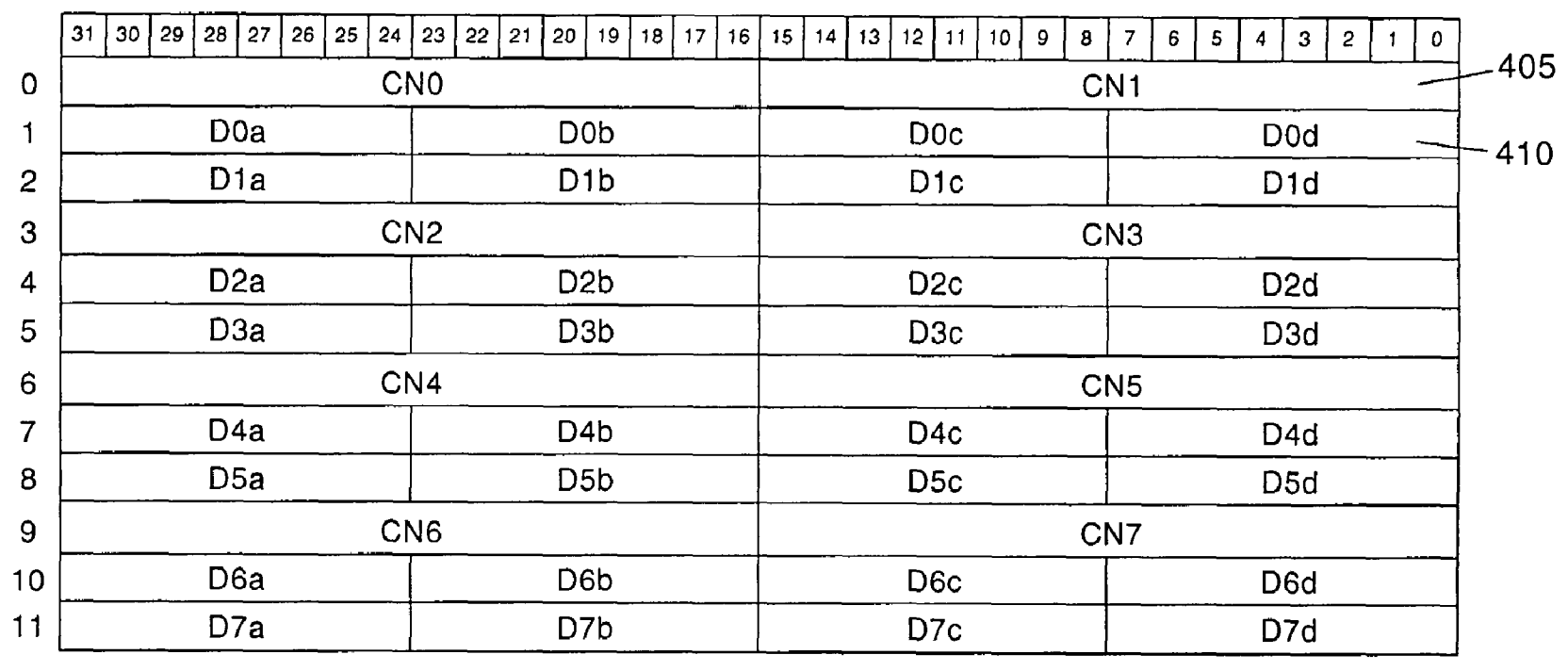

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | CN0 | | | | | | | | | | | | | | | | CN1 | | | | | | | | | | | | | | | |
| 1 | D0a | | | | | | | | | | | D0b | | | | | | | | D0c | | | | | | | D0d | | | | | |
| 2 | D1a | | | | | | | | | | | D1b | | | | | | | | D1c | | | | | | | D1d | | | | | |
| 3 | CN2 | | | | | | | | | | | | | | | | CN3 | | | | | | | | | | | | | | | |
| 4 | D2a | | | | | | | | | | | D2b | | | | | | | | D2c | | | | | | | D2d | | | | | |
| 5 | D3a | | | | | | | | | | | D3b | | | | | | | | D3c | | | | | | | D3d | | | | | |
| 6 | CN4 | | | | | | | | | | | | | | | | CN5 | | | | | | | | | | | | | | | |
| 7 | D4a | | | | | | | | | | | D4b | | | | | | | | D4c | | | | | | | D4d | | | | | |
| 8 | D5a | | | | | | | | | | | D5b | | | | | | | | D5c | | | | | | | D5d | | | | | |
| 9 | CN6 | | | | | | | | | | | | | | | | CN7 | | | | | | | | | | | | | | | |
| 10 | D6a | | | | | | | | | | | D6b | | | | | | | | D6c | | | | | | | D6d | | | | | |
| 11 | D7a | | | | | | | | | | | D7b | | | | | | | | D7c | | | | | | | D7d | | | | | |

| Byte | D7 | D6 | D5 | D4 | D3 | D2 | D1 | D0 |
|---|---|---|---|---|---|---|---|---|
| 0 | | | | K28.5 | | | | |
| 1 | | | ingress-Length[15:8] | | | | | |
| 2 | | | ingress-Length[7:0] | | | | | |
| 3 | | | QNR | | | | DLP | |
| 4 | | | PORT-BITMAP[39:32] | | | | | |
| 5 | | | PORT-BITMAP[31:24] | | | | | |
| 6 | | | PORT-BITMAP[23:16] | | | | | |
| 7 | | | PORT-BITMAP[15:8] | | | | | |
| 8 | | | PORT-BITMAP[7:0] | | | | | |
| 9 | reserved | | | | epd | bcid | | TST |
| 10 | efc | | EBP | | | Ini | lci | s |
| 11 | gfc | | | | vpi[7:4] | | | |
| 12 | vpi[3:0] | | | | vci[15:12] | | | |
| 13 | vci[11:4] | | | | | | | |
| 14 | vci[3:0] | | | | pti | | | clp |
| 15 | connection-tag[15:8] | | | | | | | |
| 16 | connection-tag[7:0] | | | | | | | |
| 17 | payload byte 1 | | | | | | | |
| 18-63 | payload byte 2-47 | | | | | | | |
| 64 | payload byte 48 | | | | | | | |
| 65 | crc | | | | | | | |

Figure 5

| Group Coding | TDM Group Mapping |
|---|---|
| 4'b0000 | Group - 0 |
| 4'b0001 | Group - 1 |
| 4'b0010 | Group - 2 |
| 4'b0011 | Group - 3 |
| 4'b0100 | Group - 4 |
| 4'b0101 | Group - 5 |
| 4'b0110 | Group - 6 |
| 4'b0111 | Group - 7 |
| 4'b1000 | Group - 8 |
| 4'b1001 | Group - 9 |
| 4'b1010 | Group - 10 |
| 4'b1011 | Group - 11 |
| 4'b1100 | Reserved |
| 4'b1101 | Reserved |
| 4'b1110 | Test/Monitor Port |
| 4'b1111 | Local Microprocessor |

Figure 7

| Address | Content | Offset |
|---|---|---|
| 0x5c07fffc | Test Port TDM Data (64) | 131071 |
| 0x5c07ff00 | | 131008 |
| 0x5c07f0fc | Signaling TDM Data Buffer (64) | 131007 |
| 0x5c07fc00 | | 130944 |
| 0x5c07fdfc | Reserved (89984) | 130943 |
| 0x5c028000 | | 40960 |
| 0x5c027ffc | Sine Lookup Table (8192) | 40959 |
| 0x5c020000 | | 32768 |
| 0x5c01fffc | Tone Data C (8192) | 32767 |
| 0x5c01800 | | 24576 |
| 0x5c07fffc | Tone Data B (8192) | 24575 |
| 0x5c01000 | | 16384 |
| 0x5c00fffc | Tone Data A (8192) | 10303 |
| 0x5c008000 | | 8192 |
| 0x5c07fffc | Continuity Test Data Buffer (4096) | 8191 |
| 0x5c004000 | | 4096 |
| 0x5c003ffc | Merge Descriptors (4096) | 4095 |
| 0x5c000000 | | 0 |

Figure 12A

| Merge Select | Comments |
| --- | --- |
| 4'b0000 | COT Loopback |
| 4'b0001 | User Data |
| 4'b0010 | Signaling Data (local uP TDM) |
| 4'b0011 | Reserved (Error) |
| 4'b0100 | Ringback |
| 4'b0101 | Silence |
| 4'b0110 | Idle |
| 4'b0111 | Milliwatt Trunk |
| 4'b1000 | External TDM (Munich) |
| 4'b1001 | Test Port |
| 4'b1010 | COT Trunk Tone Low (1780 Hz) |
| 4'b1011 | COT Trunk Tone High (2010 Hz) |
| 4'b1100 | Reserved (Error) |
| 4'b1101 | Reserved (Error) |
| 4'b1110 | Reserved (Error) |
| 4'b1111 | Expanded Tones |

Figure 12C

SWITCHING SYSTEM AND METHOD HAVING LOW, DETERMINISTIC LATENCY

RELATED APPLICATION

This application claims priority to U.S. provisional application No. 60/185,011 under section 119.

BACKGROUND OF THE INVENTION

1. Field of the Invention

The present invention relates to telecommunication switching and, more specifically, to merging information from a plurality of circuits into a packet or cell and scheduling such a packet or cell for delivery through a packet or cell-based core switching fabric to achieve low and deterministic switching latency.

2. Discussion of Related Art

Traditional telephone networks are "circuit-based," meaning that the network dedicates resources to form a connection from source (e.g., calling party) to destination (e.g., called party). More specifically, to establish such a circuit-based communication, the network dedicates certain "time slots" or "circuits" within a predefined time division multiplexing (TDM) technique, such as T1: e.g., within T1 there are 24 time segments, called DS0 circuits and within T3 there are 28 time segments called DS1 circuits. (Other standards have other analogous organizations.) By conveying information within the time slots, a connection may be formed that is synchronous and that has known, consistent bandwidth.

Switches are placed throughout the telecommunications network. At switching points, a given circuit on a given link may be "switched" to another circuit on another link. Thus, information may be carried into the switch at a first time slot on a first T1 link, but carried away from the switch on a second time slot on a second T1 link.

One problem with the above approach is that unused timeslots are in effect wasted bandwidth. This unused bandwidth is particularly inefficient in contexts where the switch is being used to carry data (as opposed to voice), which occurs in bursts.

Relatively new methods of communication, such as Asynchronous Transfer Mode (ATM) networks, provide the capability of dynamically distributing bandwidth to connections in a switch. ATM organizes information as cells, each having a header and a payload (as do other cell- and packet-based techniques). Unlike TDM techniques which inherently identify the data by the time slot in which the data is conveyed, ATM (and other cell- or packet-based) techniques identify the data by address information in the cell header. The cell payload is used to carry the data to be transferred.

There are at least three problems with using ATM (or for that matter any other cell-based or packet-based approach) to implement TDM circuit services. First, it takes time (and thus introduces delay) to fill an ATM cell with a full payload of circuit data. For example, if an ATM cell were to hold data for only one DS0 circuit connection, a fill time delay of 5 milliseconds is needed to fill the 48 octets of an ATM cell. Second, extra delay is introduced by queuing cells. With conventional ATM switching techniques, by definition, there is no timing relationship of information in different cells (thus the term asynchronous). Consequently, multiple cells may converge on the same output of a switch (i.e., multiple cells destined to the same output), and thus the cells may need to be queued. Third, inherent timing information is lost in the ATM network, since it is asynchronous. To compensate for this, there are ATM Adaptation Layers (AAL), such as AAL1, that include timing information that can be extracted by the termination point to reestablish the timing reference to the input.

SUMMARY

One feature and advantage of the present invention is that through novel merging of circuit data into a cell or packet and novel scheduling thereof, the inefficiencies of time slot interchange techniques are overcome and the efficiencies of cell techniques are achieved, while at the same instant preserving the necessary and inherent timing relationships of circuit data.

Another feature and advantage of the present invention is that a cell- or packet-based core switching fabric is used yet low and deterministic switching latency are achieved.

Another feature and advantage of the present invention is that minimal buffering is needed, thereby reducing delay of information and cost of the switching system.

Another feature and advantage of the present invention is that the packet- or cell-based core facilitates the integration of various services into the switch.

In accordance with the invention, a system and method of switching information in a time division multiplexed (TDM) communications network are provided. The TDM time slots correspond to channels of circuit information. A circuit interface receives information from the TDM communication network, extracts circuit data therefrom, and provides the extracted circuit data on an internal bus. It also receives circuit data from an internal bus and transmits the data received from the internal bus on to the TDM communications network. A switching fabric receives packets having a header and a payload in which the header includes information identifying a destination for the packet and in which the fabric transmits a received packet in accordance with the destination identification in the packet header. Adaptation logic, in response to the circuit interface, packs information from multiple circuits into a payload of a packet and schedules the delivery of such a packet to the fabric. The adaptation logic receives packets from the switching fabric and extracts circuit data from multiple packets onto an identified channel.

Under another aspect of the invention, the adaptation logic provides channel numbers in the payload of the packet that identify the channel on which the circuit data should eventually be transmitted.

Under yet another aspect of the invention, the adaptation logic packs information from multiple circuits into a payload and provides channel numbers to interleave circuit data and channel numbers in the payload.

Under yet another aspect of the invention, the interleaved relationship is defined by providing two channel numbers followed by four bytes of information for each channel, and wherein the relationship is repeated for a total of eight channels.

Under yet another aspect of the invention, there are multiple instances of adaptation logic and the scheduling of packets is done cooperatively to ensure that for each scheduling time there is no contention to a specified destination.

BRIEF DESCRIPTION OF THE DRAWING

In the Drawing,

FIG. 4 shows the payload organization of a cell packed with circuit data according to a preferred embodiment of the invention;

FIG. 5 shows an exemplary cell format;

FIG. 7 shows exemplary group encodings used in a channel number;

FIGS. 12A-C illustrate an exemplary arrangement of control ram in an FSU, an exemplary merge descriptor, and exemplary encoding of a merge select field according to a preferred embodiment of the invention;

DETAILED DESCRIPTION

Preferred embodiments of the invention provide logic to surround a cell- or packet-based core switching fabric (e.g., an ATM core switch fabric) to provide a low delay switching facility for circuit data. The core fabric provides a high bandwidth transport and allows other services, such as data switching, to be offered economically and reliably. The logic surrounding the switching fabric packs circuit data into cells or packets such that data from multiple circuits are contained in a given cell, destined for a given module. The cell or packet is then scheduled relative to all other cells or packets having circuit data so that the cell (and no other cell having circuit data) is sent via the switch fabric to the given module. By avoiding contention at the given module, queuing delay is reduced. Once the cell is at the module, the logic unpacks the cell and/or packet to retrieve the circuit data from the cell or packet so that the circuit data may be transmitted in its correct corresponding timeslot on its correct corresponding communication link. Under preferred embodiments, the payload of the cell includes both the circuit data and circuit identification information.

System Overview

Figure 1:
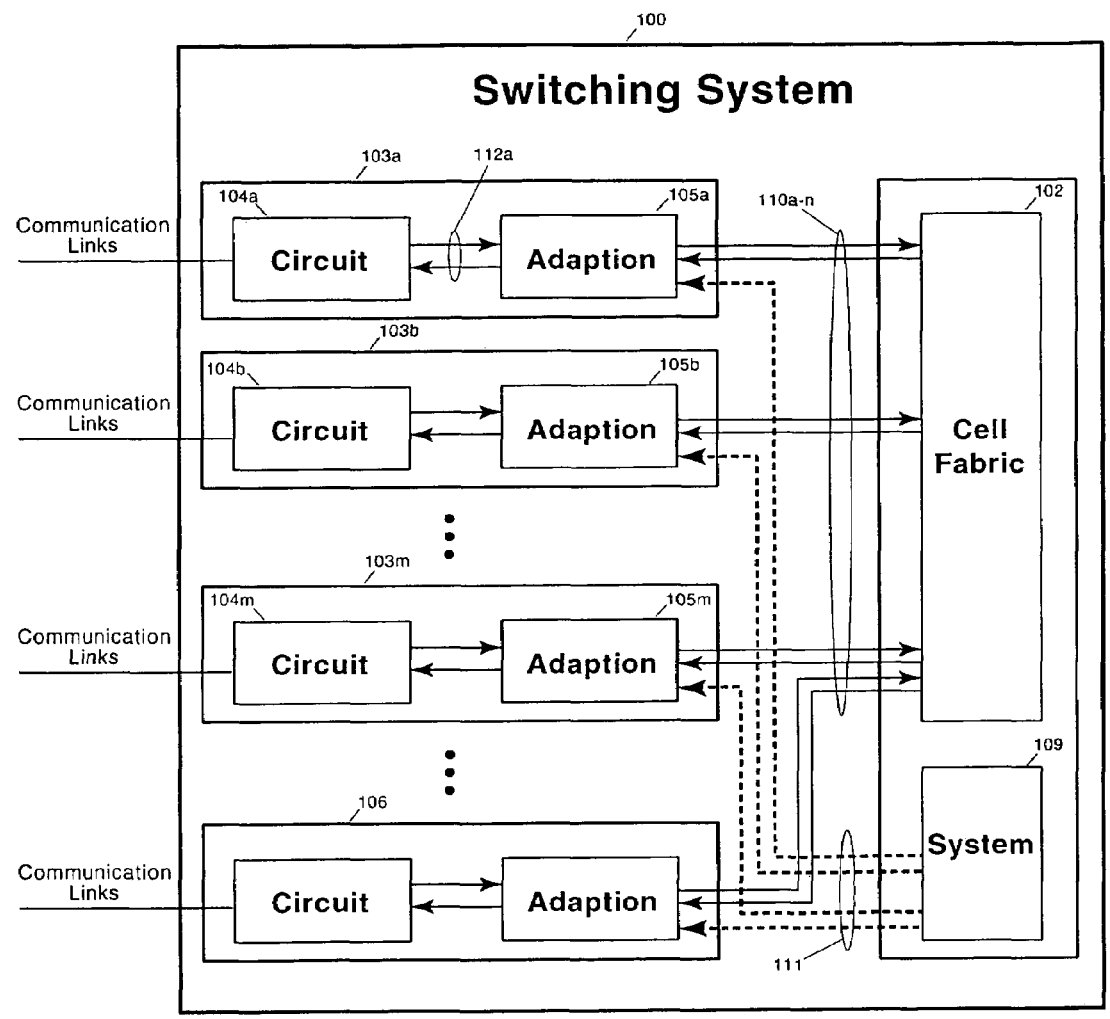
FIG. 1 depicts block diagram of a system according to a preferred embodiment of the invention.

FIG. 1 shows a telecommunication switching system 100 in which preferred embodiments of the invention may operate. I/O modules 103a-m and alternative module 106 are connected via serial links 110a-n with switching fabric core 102. The I/O modules in this exemplary embodiment may be connected to the PSTN, via T1 or T3 links or the like (not shown), and the alternative module 106 may be connected to a frame service. (This module is shown to illustrate that the preferred embodiment is not limited to any particular telecommunication service.) The I/O modules 103a-m and alternative module 106 receive control and centralized clocking information via control links 111 from the system processor 109. (Alternative embodiments may employ redundant configurations of the system processor 109 and/or the switch fabric 102.) The switching fabric core 102 performs cell switching functions. Specifically, the core receives on its ports serial data arranged as cells (e.g., ATM cells) or packets. Those cells include information in their header indicating on which ports the received data should be sent. The core 102 then transmits the cell on the indicated port. In this fashion, I/O module 103a may send a cell of data to I/O module 103b by including in the cell header information indicating that the port b (i.e., the port on which I/O module 103b is connected) should receive the cell. Certain embodiments use Atlanta chips available from Lucent to implement the core 102. If cells contend for a port, the fabric 102 resolves such contention.

Each of the I/O modules 103a-m may be connected to one or more communication links such as T1 or T3 links or the like. Each I/O module 103 includes a circuit interface 104 appropriate for the type of communication link(s) to which the module is connected. The circuit interfaces are responsible for terminating circuit data from a communication link and for transmitting data onto a communication link. They are also responsible for performing parallelization of received circuit data and serialization of data to be transmitted on a communication link. They are also responsible for performing framing and synchronization functions.

For data received from a communication link, the circuit interfaces transmit data via bus 112 to an adaptation function 105. Under preferred embodiments, the protocol of bus 112 corresponds to the TDM organization of information on the communication links. Thus, for example, the bus 112 carries DS0 data, one byte or octet at a time, for a T1 communication link.

The adaptation function 105 converts the circuit-based data from the communication link to a form suitable for the core switching fabric 102. For example, in embodiments using a ATM cell core 102, the adaptation function converts the circuit-based TDM data into cell format for transmission to the switching fabric core 102.

Conversely, the adaptation function 105 converts cell- or packet-based data from the core 102 to the circuit-based form expected by the communication link connected to the circuit interface 104.

Under preferred embodiments, the adaptation function performs the following novel operations. First, the adaptation function 105 packs data from a plurality of circuit channels into a given cell. Thus, for example, if a given module X is connected to a T1 link and three circuits from this link are to be switched to communication links connected to another module Y, then these three circuits will have their circuit data packed into one cell to be transmitted to module Y. Module Y upon receipt will unpack the data (i.e., demultiplex the data) and ensure that the data is transmitted in the correct corresponding timeslot for the circuit data on the correct corresponding link. Second, the adaptation function 105 sends the cell to the switch in a prescheduled manner that avoids contention with other cells having circuit data. More specifically, when module X is transmitting a cell to module Y the scheduling is arranged such that module X and only module X will be sending a cell having circuit data to the core 102 with a destination of module Y at that cell time instant.

The system processor 109 is responsible for system-wide scheduling and switching. It acts as the switch resource manager for assigning circuits and performs the necessary global resource allocation in response to various forms of signaling messages, for example, indicating a call set-up or a call teardown. For example, in response to a call set-up, the system processor 109 determines which TDM circuits should handle the data from the call and it informs the appropriate I/O modules accordingly. As will be explained below, the system processor 109 then informs the relevant I/O modules accordingly so that they pack and unpack the circuit data in the appropriate cells, and so that the cells are scheduled in a contention-free manner. It is also responsible for ensuring tone generation and other telecommunication services are handled at the appropriate times.

As will be explained below, signaling information is handled in a variety of manners. For example, low level signaling is handled locally at an I/O module 103. In these cases, the I/O module 103 is configured by the system processor 109 to expect such signaling information at known time slots. The I/O module will extract such signaling information and handle it locally, for example, via a local processor described in later paragraphs. Higher level signaling is handled by the system processor 109. In these instances, the signaling information will be sent to the system processor 109 via the switch fabric 102. For example, IP messages will be encapsulated in cells using AAL5 and sent to the system processor 109 via fabric 102.

Figure 2:
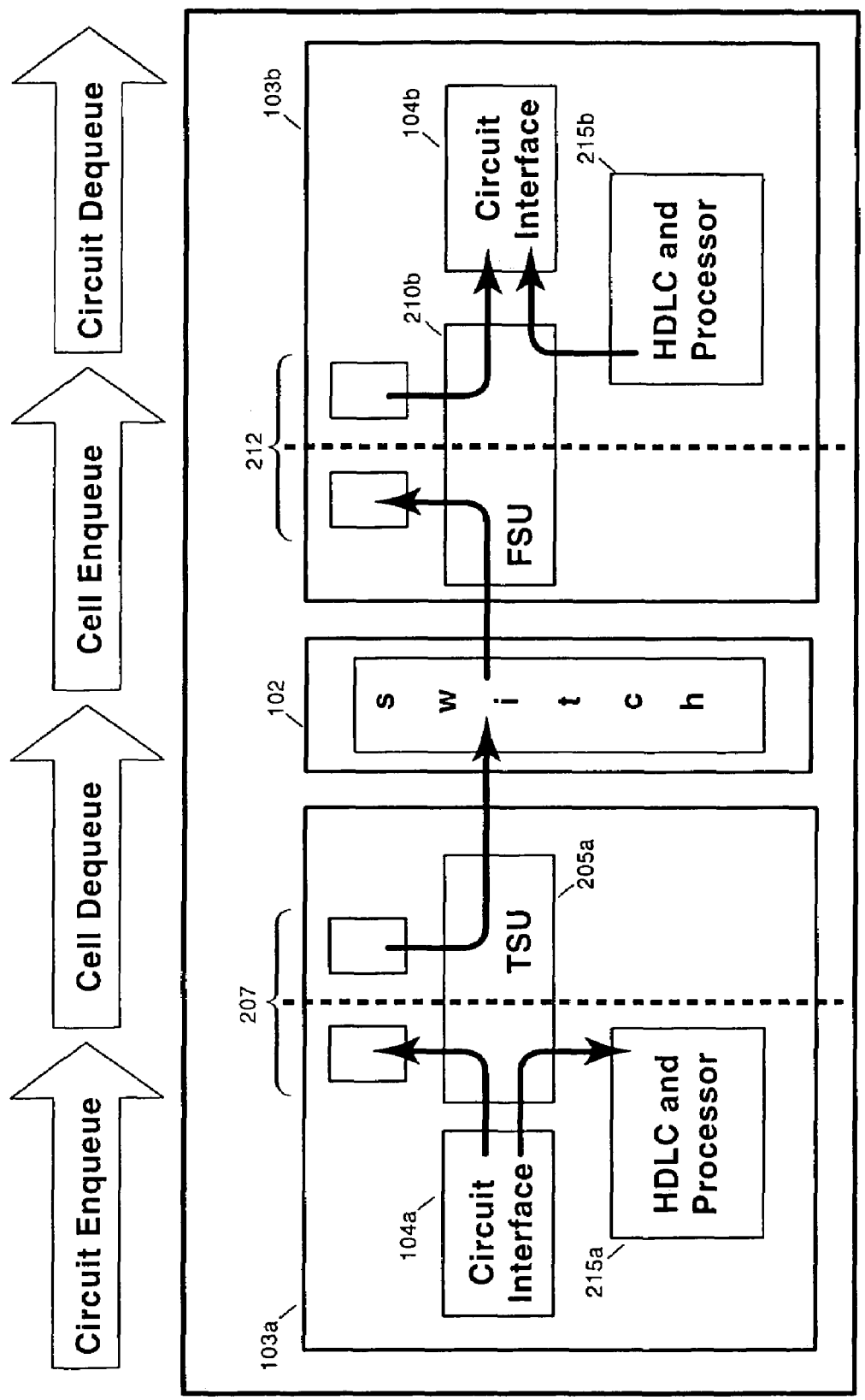
FIG. 2 shows the adaptation functions at a switch port according to a preferred embodiment of the invention.

FIG. 2 is an architectural diagram illustrating the information flow for circuit data and lower level signaling information. In this figure, only the relevant portions of the adaptation function 105 are shown.

Circuit data is received by the circuit interface 104a of module 103a and sent to a To Switch Unit (TSU) 205a within the adaptation function 105. If the data is in bound signaling information (as identified in a configuration operation by system processor 109, as explained below), e.g., SS7 signaling, then the information is sent to a local processor 215a for processing. This may involve the local processor 215a communicating with the system processor in one or more ways as will be explained below. If the data is circuit data, then the data is sent to a buffer 207 as part of a circuit data enqueuing operation.

In parallel with the above, the TSU is simultaneously reading data from buffer 207 as a cell data dequeuing operation. This cell data was enqueued previously. It is organized as an ATM cell and, more specifically, as a cell packed with data from multiple circuits, as will be explained below. The header of the cell includes information indicating which I/O module should receive the cell. In this example, the header indicates port b, that is, the port on which I/O module 103b is connected. The cell is then transmitted to cell switching core 102 which then sends that cell to port b. Because the I/O modules are controlled to operate synchronously with respect to one another and are scheduled to avoid contention, at the given moment (cell time) when I/O module 103a is sending the cell to the core 102, none of the other I/O modules is sending a cell destined for port b. (The other modules may be sending cells to the core, but they are addressing different ports, and thus I/O modules, in the header.) The cell is transmitted to module 103b via core 102, and a From Switch Unit (FSU) 210b receives the cell and stores it in buffer 212 as part of a cell data enqueuing operation. The FSU extracts circuit data and stores in buffer 212 the data in unpacked form. (The unpacking operation is described in further detail below.) In parallel with the cell enqueuing operation by the FSU 210b, the FSU reads data from the buffer 212 as part of a circuit data dequeuing operation. This data was enqueued previously. The data is read from the buffer in a controlled and scheduled manner so that the data may be sent to the circuit interface 104b at the appropriate time slot for that circuit data. In addition, the FSU may receive signaling information from the local processor 215b to send signaling information to the circuit interface 104b.

As will be explained below, the I/O modules schedule their operation in accordance with a cell scheduling table (CST). The CST of each module is managed by the system processor 109 so that all of the logic surrounding the core 102 operates synchronously. For example, as described above, the TSUs operate synchronously to avoid contention at a given FSU.

Moreover, under preferred embodiments, all of the TSUs and FSUs operate synchronously via synchronized clocking and frame circuitry (not shown for the sake of clarity).

TSU

Figure 3:
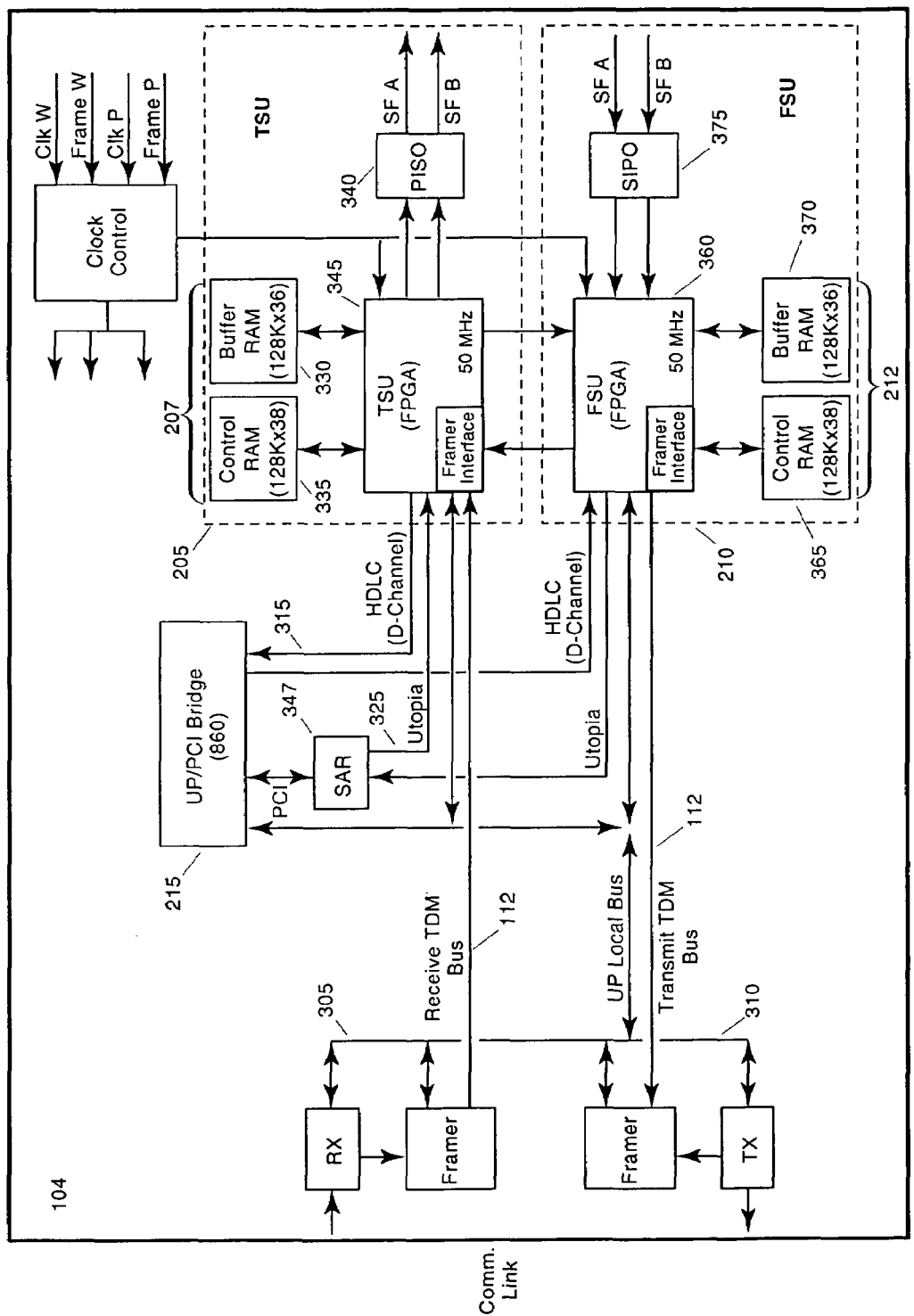
FIG. 3 shows the circuit interface logic, and adaptation logic according to a preferred embodiment of the invention.

FIG. 3 is a more detailed architectural diagram of the circuit interface 104, the TSU 205, buffer 207, and the local processor 215. More specifically, receive and transmit framer circuitry 305 and 310 form the circuit interface 104. TSU gate array 345 and PISO circuit 340 form TSU 205. Buffer ram 330 and control ram 335 form buffer 207.

Receiver circuitry 305 receives serial streams for a communication link, e.g., a T3 line, and sends the data on bus 112 in serial form to the TSU 205.

Each byte of data going to the TSU corresponds to a different TDM channel, for example, a DS0 circuit. Some of the ingress data is not circuit data but instead is in bound signaling data, such as SS7 or LAPD data. As will be explained below, under certain embodiments, the TSU collects and sends such signaling information via local signaling bus 315 to the a local processor 215 for further processing.

The TSU 205 may also receive IP frames from local processor 215 via messaging bus 325. Under certain embodiments, a segmentation and re-assembly (SAR) circuit 347 is used for such frames. In a preferred embodiment, these frames are used to carry messages formatted according to ATM AAL5 protocol. Typical uses of AAL5 messaging are fault and alarm reporting and signaling operations involved with call setup and the like.

The TSU gate array 345 of one embodiment is a field programmable gate array and implements all ingress functionality (i.e., from the circuit interface) and egress functionality (i.e., to the switch fabric) for the TSU. It handles messages from local processor 215, sends signaling messages in the TDM data stream to the local processor 215, performs the circuit to ATM adaptation, and various other forms of testing and control functions. The TSU gate array 345 writes TDM circuit data and/or local processor messages to buffer 207, and reads TDM cells and/or local processor messages from buffer 207. The buffer operations are prescheduled to ensure that there is adequate bandwidth to address all operations and to ensure that the TSU operates with deterministic delay.

Under preferred embodiments, buffer 207 is formed from two physical buffers, buffer ram 330 and control ram 335. The buffer ram 330 stores the circuit data received from the circuit interface 104 and AAL5 ATM cell streams destined for the system processor 109. The control ram 335 is used for holding data structures used in processing the data streams.

Under certain embodiments, the buffer ram 330 is memory mapped so that locations with higher addresses are used to hold data for AAL5 messages, and the locations with lower addresses are used to hold circuit data. Moreover, the locations with lower addresses are accessed in a phased manner. In this fashion, circuit data coming from the circuit interface may be placed into the buffer (enqueued) in one phase, and the data may be read from the buffer (dequeued) for subsequent transmission to the switch fabric in a second phase.

Then, the structures may be swapped, so that the buffers used for enqueuing are used for dequeuing and vice-versa.

Data flows into and from buffer ram 330 as two separate processes: an ingress process and an egress process. The ingress and egress processes operate simultaneously. Data stored in the buffer ram 330 is typically stored temporarily, just long enough for it to be scheduled for subsequent cell dequeuing and delivery to switch fabric 102.

More specifically, the ingress functionality includes the following data and control operations performed to the buffer ram 330:

1. buffer TDM bytes from the circuit interface 104;
2. buffer messages from the local processor 215.
3. dequeue a buffer from a free queue of cells used to hold data from local processor messages;
4. enqueue the cell holding data from local processor messages onto a queue of such cells; and
5. enqueue newly allocated cells holding TDM data onto a queue of such cells.

These operations are further described below, in conjunction with the timing of such operations.

With regard to the egress functionality, the following data operations to the buffer ram 330 are performed by gate array 345:

1. read TDM cells to be sent to the switch fabric 102;
2. read cells holding local processor messages to be sent to the switch fabric 102.
3. dequeue a cell holding local processor messages from a queue of such messages and send it to the switch fabric 102;
4. enqueue a cell holding local processor messages to a free queue of such messages after the cell has been sent to the switch 102;
5. dequeue a TDM cell from a queue of such messages using round-robin scheduling for dequeuing, and send such cell to the switch;
6. enqueue a TDM cell to a TDM queue using round-robin scheduling.

These operations are further described below, in conjunction with the timing of such operations.

The local processor 215 may also access the buffer ram 330 for diagnostic purposes, and the system processor 109 may access the buffer ram using a serial link (not shown) to update channel numbers in a TDM cell for reasons stated below.

The available cell buffers for AAL5 streams are managed using a linked list technique with hardware support in the TSU gate array 345. In addition, the cell buffers used for ATM streams (with cells holding circuit data) are also managed using a linked list with hardware support in the gate array 345. In this arrangement, each cell (as stored in buffer ram) includes a pointer to the next cell. Under certain embodiments, there are multiple linked lists per port. The cells on each list, though destined for the same port, may have different sets of circuit data packed into it. In certain embodiments, after a cell is dequeued, that cell is "moved," through pointer manipulation, to the end of list.

As stated above, the TSU packs data from multiple circuits into a given cell for delivery to the switch fabric 102. For each addressable I/O module 103 and thus for each port, the TSU creates a cell if necessary. For any given cell, the TSU logic packs circuit data for up to 8 circuits in the cell, in conjunction with information identifying the specific circuit corresponding to the data. Cells for a given port are linked together so that the list arranges the cells holding the data for all of the TDM channels to that port.

FIG. 4 shows the format used in the cell payload. In this arrangement, data for 8 channels CN0-CN7 are included, with 4 bytes of information, e.g., D0a-D0d for CN0, for each channel. The channel number fields 405 contain information identifying the channel on which the data ought to eventually be transmitted on, and the data fields 410 contain the channel data. By including the channel number information in the cell payload, subsequent demultiplexing is simplified. Alternative embodiments can pack more information into a cell by not including the channel number information 405 in the cell at the expense of slightly more complicated demultiplexing.

FIG. 5 illustrates an exemplary cell format. The cell payload 400 of FIG. 4 is contained in payload field 510 of such a cell. The field 515 of the cell identifies the port connected to the switch fabric 102 and thus the I/O module for which that the cell is destined.

Figure 6:
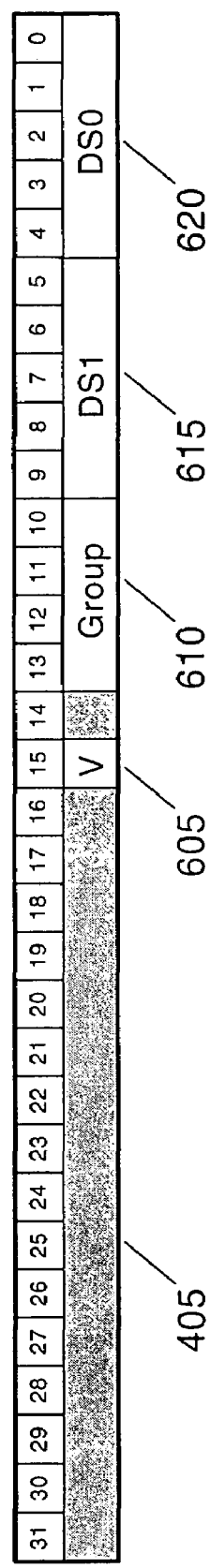
FIG. 6 shows the channel number format used within a cell payload according to a preferred embodiment of the invention.

FIG. 6 shows an exemplary format for the channel number 405 contained in a preferred format of the cell payload 400. A validity bit 605 indicates whether the channel number is valid, and thus whether the corresponding data is valid. Referring to FIG. 4, for example, CN0 corresponds to the data fields 410 labeled D0a, D0b, D0c, and D0d. Interface Group field 610 identifies a group of TDM channels, such as Line Interface Data (i.e., circuit data), test/monitor data, and data from local microprocessor 215. Each group contains 1024 channels. DS1 field 615 addresses a DS1 within a Group. DS0 field 620 identifies the DS0 within a DS1 stream. FIG. 7 shows exemplary encodings 4'b0000 to 4'b1111 of group field 610.

Figure 8:
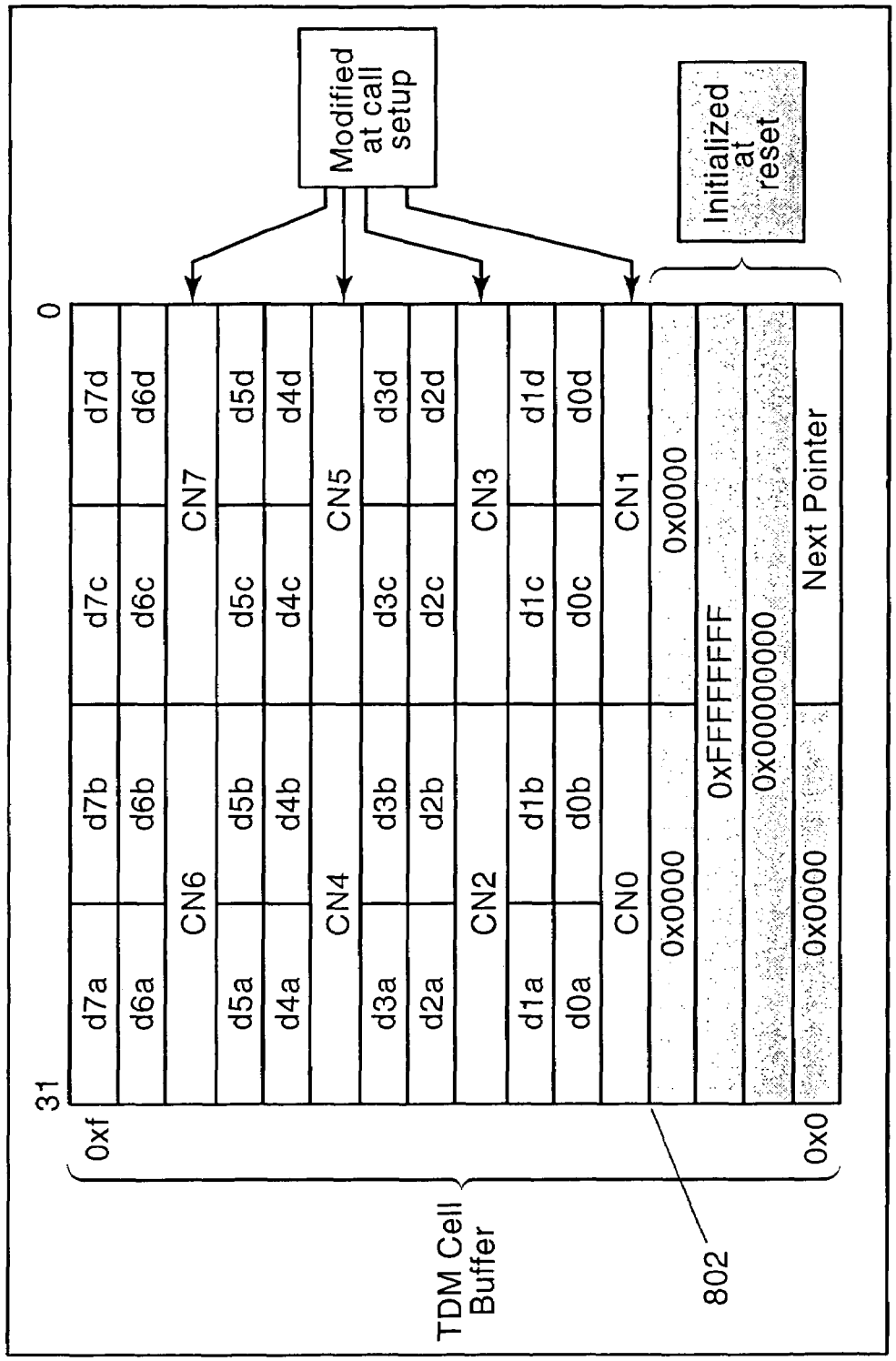
FIG. 8 shows the data organization within buffer ram used to hold cell data according to a preferred embodiment of the invention.

FIG. 8 shows how data is internally organized in buffer ram 330 for a given cell. In this arrangement, 64 bytes of space in ram 330 are allocated for each cell. Of these bytes, 48 bytes hold the payload information described in conjunction with FIG. 4. The data is organized in ram 330 so that as it is sequentially accessed (starting at indexed address 802) it is retrieved in the organization shown in FIG. 4. Included with the data is a pointer 805 pointing to the next cell in ram 330 destined for the same port.

Under certain embodiments, two sets of such cell organizations are provided. Each set includes 1K cell organizations. The cell arrangements in buffer ram 330 are managed using linked list techniques, in which there is a fixed storage amount of 1K cells (64K bytes) per set, and in which there is a free storage list of cells and individual lists for each port in the switch fabric 102. The two sets of such cells (and lists) are accessed in ping pong fashion. Under this approach, one of the cells having a given set of channel numbers (and thus destined for a corresponding port) is in the process of being filled with circuit data corresponding to those channel numbers, while another cell that is already filled with circuit data for the same set of channel numbers is in the process of being read from buffer 330 and sent to the fabric 102. When the one cell is filled, the roles reverse. That is, the one cell is now read from, and the other cell is written to.

Under certain embodiments, the linked list management functionality (i.e., reading and writing of next pointer fields etc.) is handled by a pointer engine in hardware (not shown).

The channel number information is potentially modified with each call setup (along with modifying similar information in control ram discussed below). This information is conveyed from the system processor 109.

Under preferred embodiments, the control ram 335 is used for the following:

1. local microprocessor TDM data buffer
2. input channel descriptors
3. cell scheduling table
4. test port TDM data buffer As alluded to above, the local microprocessor 215 is responsible for certain signaling operations. More specifically, time slots within SS7 or PRI ISDN links (or others) are used to transmit signaling information. The system processor 109 configures the TSU so that the TSU knows which time slots contain signaling information and so that the TSU may extract that information and send it to the local microprocessor 215. The TSU 205 collects this information in the control ram temporarily (to match clock speeds of the various busses) and eventually sends this information to the local processor 215 via bus 315.

The system processor 109 configures the channel descriptors in control ram 335 in conjunction with session management, such as call setup and tear down. Among other things, the channel descriptors identify how the associated ingress TDM channel should be processed. In certain embodiments, these descriptors are accessed using a serial link (not shown) but alternative embodiments can access the control ram via messaging between the system processor and the local processor. The possible operations that may be performed on a channel (and thus described in a channel descriptor) are (1) buffer the data as user data in a TDM cell to be sent to the switch fabric 102; (2) map the data as a signaling channel onto a TDM stream going to the local microprocessor 215; and (3) map the data onto a test port (e.g., to implement continuity testing, or loopback).

Figure 9:
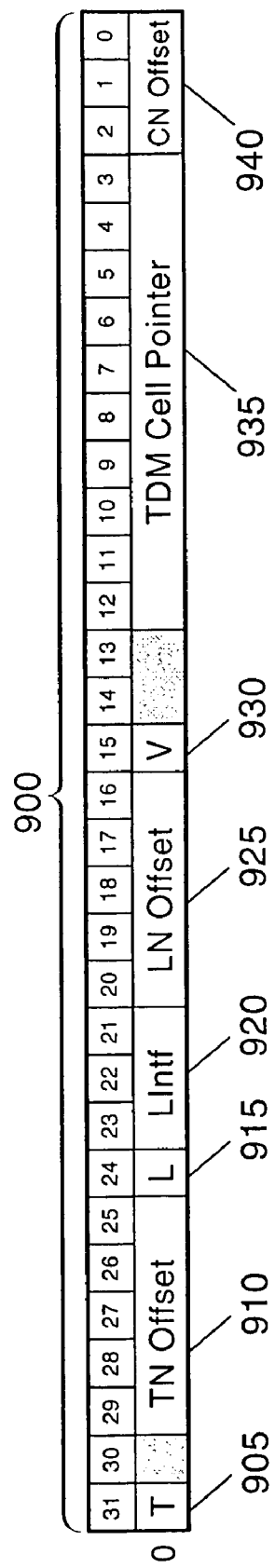
FIG. 9 shows a channel descriptor according to a preferred embodiment of the invention.

FIG. 9 shows an exemplary channel descriptor 900. Test bit 905 indicates whether the channel is destined for a test port. TN Offset 910 identifies the timeslot within the test port TDM stream. Local bit 915 indicates whether the channel is destined for the local processor 215, and the local interface field 920 specifies which local interface to use, e.g., a TDM stream to local processor 215 or to an HDLC controller chip (not shown). LN Offset 925 identifies the timeslot within the local TDM stream. The validity bit 930 indicates that the channel is valid and that the corresponding data should be buffered in buffer ram 330. Cell pointer 935 points to the cell buffer assigned to this channel. CN Offset 940 is the offset within the TDM cell for the channel.

Figure 10:
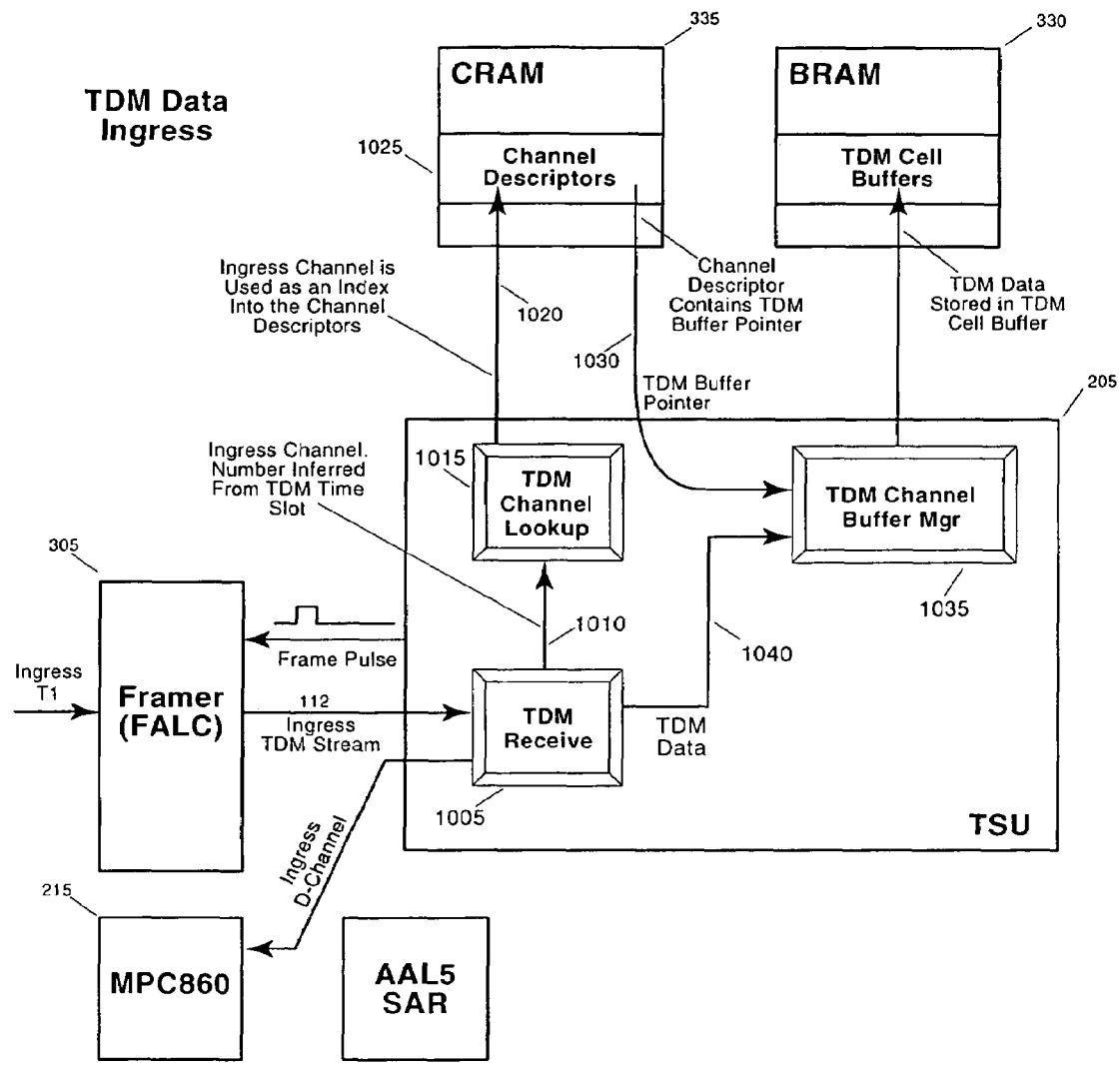
FIG. 10 shows the data flow for enqueuing circuit data into buffer ram according to a preferred embodiment of the invention.

FIG. 10 provides an illustration of the data flow for circuit data. Data is received on bus 112 by TDM receive logic 1005 within TSU gate array. The receive logic infers the ingress channel number from the timeslot within the TDM scheme. The inferred channel number 1010 is used by channel lookup logic 1015 as an index 1020 into a portion of control ram 335 used for holding channel descriptors 1025. As outlined above, the channel descriptor, among other things, contains a TDM buffer pointer. The TDM buffer pointer 1030 is returned to the gate array's TDM channel buffer manager logic 1035. In addition to receiving the pointer from channel descriptor 1025, the TDM channel buffer manager logic receives the TDM data 1040 from bus 112 via TDM receive logic 1005. That data is then written to the appropriately indexed location in buffer ram 330. The channel numbers are written into the buffer ram 330 only at the time of connection setup.

The cell scheduling table contained in control ram 335 is used to ensure that the core fabric 102 provides sufficient bandwidth for the I/O modules 103 while avoiding contention. Bandwidth management is accomplished through a combination of hardware and software. Software executing on the system processor 109 performs the resource management and allocates the switch bandwidth among all of the modules on the system. The results of such allocation are stored in the cell scheduling tables of the I/O modules 103a-m. Each I/O module has its own cell scheduling table, the entries of which are unique to that given cell scheduling table.

Each module accesses its cell scheduling table each switch fabric cell time. More specifically, in certain embodiments, each TSU 205 accesses its cell scheduling table using the same offset (or index) within the cell scheduling table that every other TSU is using at that cell time instant. The cell scheduling table entries store the destination output port for which a corresponding cell is scheduled. To avoid contention at FSUs (and thus reduce the need for queue buffers and reduce queuing delay), the software on system processor 109 ensures that at no time will an output port appear in more than one cell scheduling table at a given offset.

In one embodiment, a cell scheduling table has 736 entries, and each TSU has two cell scheduling tables, though only one is "active" at a given time. (There are 184 cell times in a 125 microsecond frame.) While one table is in use, system software may defragment the other table so that it is used more efficiently when it is made active. Then when it is made active, the first table may be de-fragmented and so-on. Fragmentation may occur as a natural consequence of call set-up and teardown. Other embodiments may vary the amount of scheduling entries, depending on the desired tradeoffs for the amount of delay acceptable. For example, other embodiments may pack more or less channel numbers in a given cell, and corresponding less or more bytes of channel data per channel in a given cell. These tradeoffs affect the number of entries in the scheduling table.

The port value stored in the cell scheduling table not only identifies the output port on which a cell will be scheduled but it is used as an index into a cell queue header table to point to the linked list that holds the next cell to send on that port. Thus, as alluded to above, each port has a linked list of cells in buffer ram 330 associated therewith. The next cell is read from the linked list in buffer ram 330 and sent to the PISO circuit 340 for transmission to the switch fabric 102.

Figure 11:
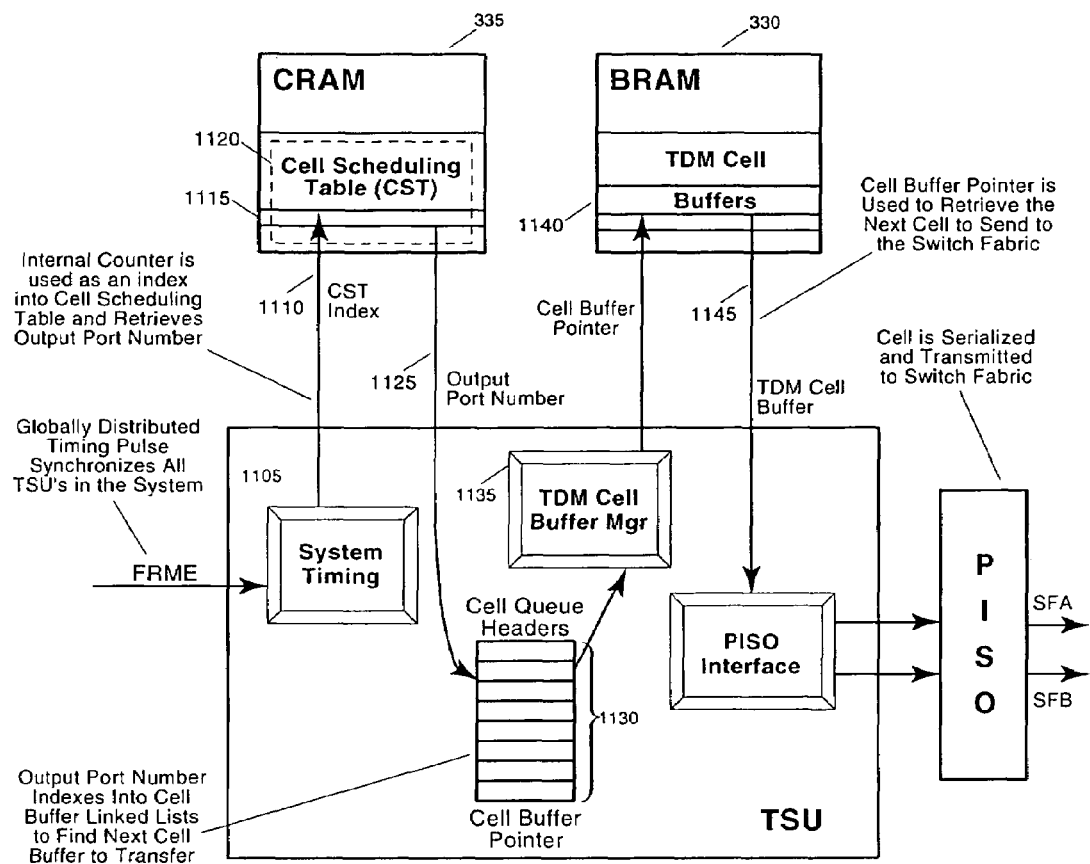
FIG. 11 shows the data flow for packing circuit data into cells and sending them to the switch fabric in accordance with a preferred embodiment of the invention.

FIG. 11 provides an illustration of the control and data flow for scheduling cells to the switch fabric from the perspective of a given I/O module 103 (and does not include the perspective of the system processor and its global resource allocation software used for programming the cell scheduling tables). System timing and synchronization circuitry 1105 ensures that all TSUs have a cell scheduling table index (CST index) 1110 in synchronism. The CST index 1110 points to one of 736 cell scheduling table entries 1115 in cell scheduling table 1120, stored in control ram 335. The table entry provides an output port number 1125, which is used to identify one of a plurality of cell queue headers 1130 (one header per port in the system). The cell queue header 1130 is used by buffer ram access logic 1135 to access a TDM cell 1140 in buffer ram 330. If the cell scheduling table entry is marked as invalid, then the logic may use this cell scheduling time to send non-circuit data, such as test data or delay insensitive cells. These cells, under certain embodiments, are marked with lower priority and sent to any port on the switch fabric. Any contention that may result from these cells (i.e., the lower priority cells) is resolved by the switch fabric itself. That is, the scheduling of circuit data cells should avoid contention on any port, but the non-circuit data may cause contention in which case the contention is resolved by fabric 102.

This TDM cell has the format and data previously described. In some embodiments, the logic will modify the cell header at this point to identify the port for which the cell is destined. In addition, in some embodiments, the logic may modify the header to reflect an appropriate priority level to be used by the core 102. For example, cells carrying circuit data (which often includes delay sensitive voice data) may be marked with the highest priority, but cells carrying non-voice data (such as for computer to computer communications via frame relay circuits) may be marked with a lower priority. The cell 1145 is then read out of ram 330 and sent to PISO circuit 340 for transmission to the switch fabric 102.

Referring back to FIG. 3, a Parallel-In-Serial-Out (PISO) circuit 340 receives byte information from the TSU and serializes it for transmission to the switch fabric core 102. Redundant switch fabrics are supported in certain embodiments, by sending the serial data on two separate serial buses SF A and SF B.

An interface 350 exists between the TSU 205 and the FSU 210. This interface is used for loopback or continuity testing.

FSU

Referring back to FIG. 3, the FSU 210 includes a FSU gate array 360, a control ram 365, a buffer ram 370, and SIPO circuit 375. The FSU 210 communicates with the transmission portion 310 of circuit interface 104 via bus 112.

A Serial-In-Parallel-Out (SIPO) circuit 375 receives serialized cell data from the switch fabric core and parallelizes it for transmission to FSU 210. The serialized form conforms to standardized cell form of 64 bytes discussed above. Redundant switch fabrics are supported in certain embodiments, by receiving the serial data on two separate serial buses SF A and SF B. To detect the arrival of a cell, the SIPO circuit 375 detects a predefined synchronization signal on the serial interface. Each cell is checked for CRC conformity to detect and isolate errors. The SIPO temporarily stores received cells in an internal FIFO buffer (not shown).

The FSU 210 may also receive a TDM stream from the local microprocessor 215. This TDM stream consists of the signaling channels, e.g., SS7 and LAPD, as discussed in relation to the TSU.

The FSU gate array 360 of one embodiment is a field programmable gate array and implements all ingress functionality (i.e., from the switch fabric) and egress functionality (i.e., to the circuit interface) for the FSU. Among other things, the gate array 360 implements a local bus protocol for providing read and write access to registers and other state mapped into system address space. It also provides a framer interface to the bus 112, and provides various forms of tone generation, signaling support and loopback testing. In addition, it provides ATM cell transfer (i.e., FSU enqueuing) and TDM frame transfers (i.e., FSU dequeuing).

The buffer ram 370 is used to store AAL5 cell data destined for the local processor interface 325, similarly to that described for the TSU. The ram 370 also stores TDM data destined for the circuit interface 104. The control ram 365 is used to hold signaling information and testing data, e.g., for continuity testing.

Cells destined for the local microprocessor are managed on linked lists, including a list of free cell buffers. Hardware processes the pointers used for the link lists, similarly to the case for the TSU.

The TDM data arrives in cells, which have the payload organization outlined above and described in conjunction with FIG. 4. The channel numbers within the payload are in the form described above in conjunction with the description of FIG. 6. The channel number identifies the specific egress DS0 channel on which the corresponding data ought to be transmitted on.

The buffer ram 370 holding the cell data received from the switch core 102 is multi-phase controlled (i.e., ping pong) similarly to that described above for the TSU buffer ram.

For cells holding circuit data, the FSU strips out the circuit data and stores it in the appropriately phased buffer locations of ram 370 based on the channel number information contained in the payload. For example, the channel numbers in the payload are used to form indices into the buffer ram for the locations to hold the corresponding data.

Simultaneously with such writing to buffer ram, data may also be read out of the ram and either sent to the circuit interface 104 or the local processor 215. The FSU logic iterates through outgoing timeslots and in the process iterates through the buffer ram 370 in an organized way to access the relevant data for the relevant timeslots at the appropriate time. The logic starts with the lowest number DS0 and reads such out for all DS1s for all DS3 circuits; then the logic repeats the same for the next highest numbered DS0 and so on. As the data is read it is provided on bus 112 to the circuit interface. Ram cycles are reserved to ensure that signaling messages may be read and sent to the local processor. Once data is read for all DS3s, the buffers are swapped (i.e., ping ponged) and the process repeats.

For ATM cells (i.e., AAL5, not circuit data), the FSU buffers the cell in buffer ram 370 temporarily until it can be sent to the local processor.

Under preferred embodiments, the control ram 365 is used for the following:
1. merge descriptors
2. buffering of signaling data from the local microprocessor 215
3. buffering of data from a test port
4. buffering of data for continuity loopback
5. look up tables for tone generation FIG. 12A shows an exemplary partitioning of control ram 365.

Figure 12B:
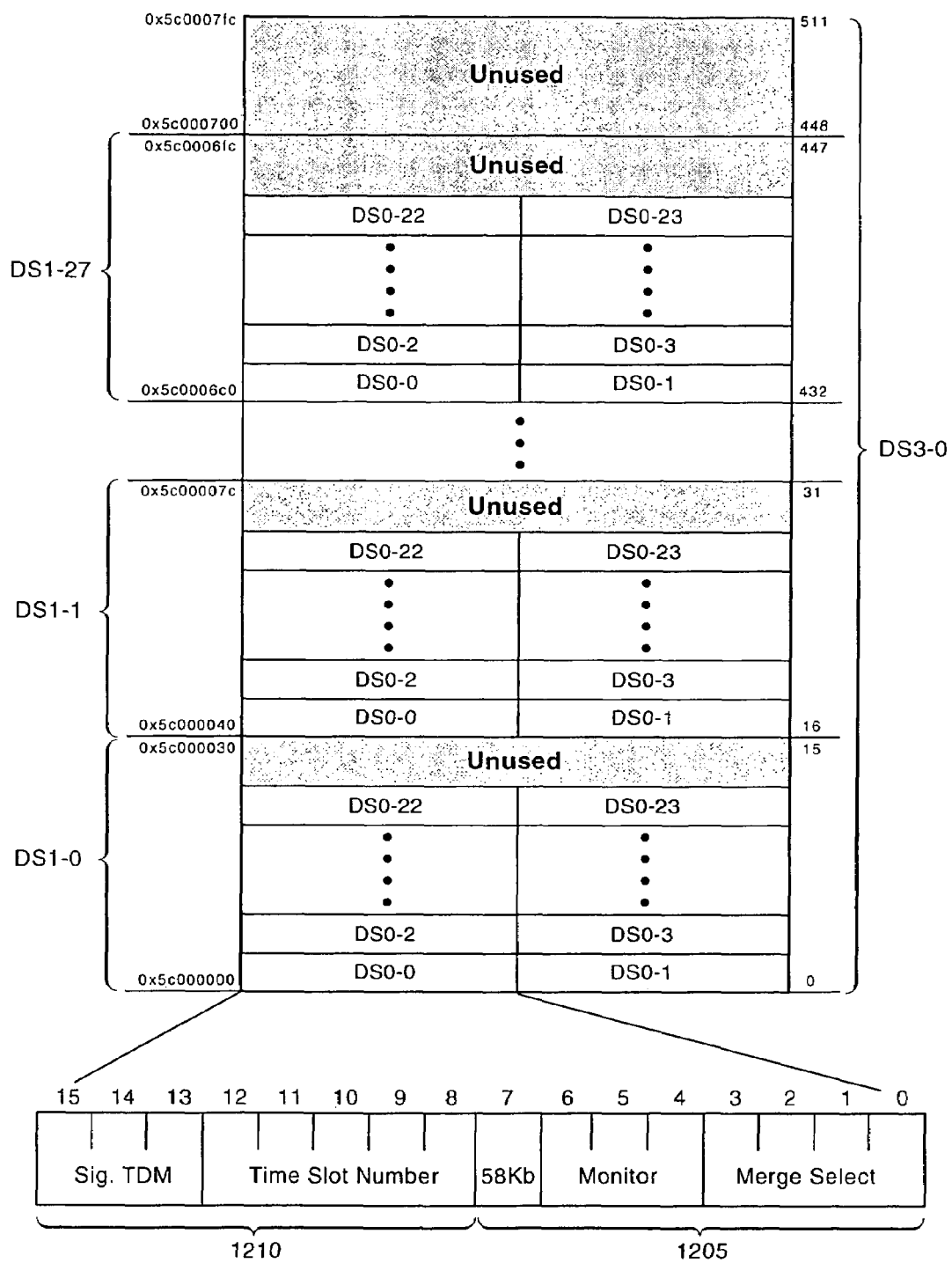

FIG. 12B shows an exemplary merge descriptor 1200 and how it is organized in relation to other merge descriptors for a DS3 circuit. Each TDM circuit is associated with a unique two byte merge descriptor. The lower byte 1205 of the descriptor selects one of 16 possible sources. FIG. 12C shows exemplary encodings 4'b0000 to 4'b1111 of this field and the corresponding timeslots. The upper byte 1210 is only used when the lower byte 1205 is set to test port or signaling channel encodings. In this case, the upper byte specifies a timeslot when the test port or signaling data should be merged into the TDM stream.

Figure 13:
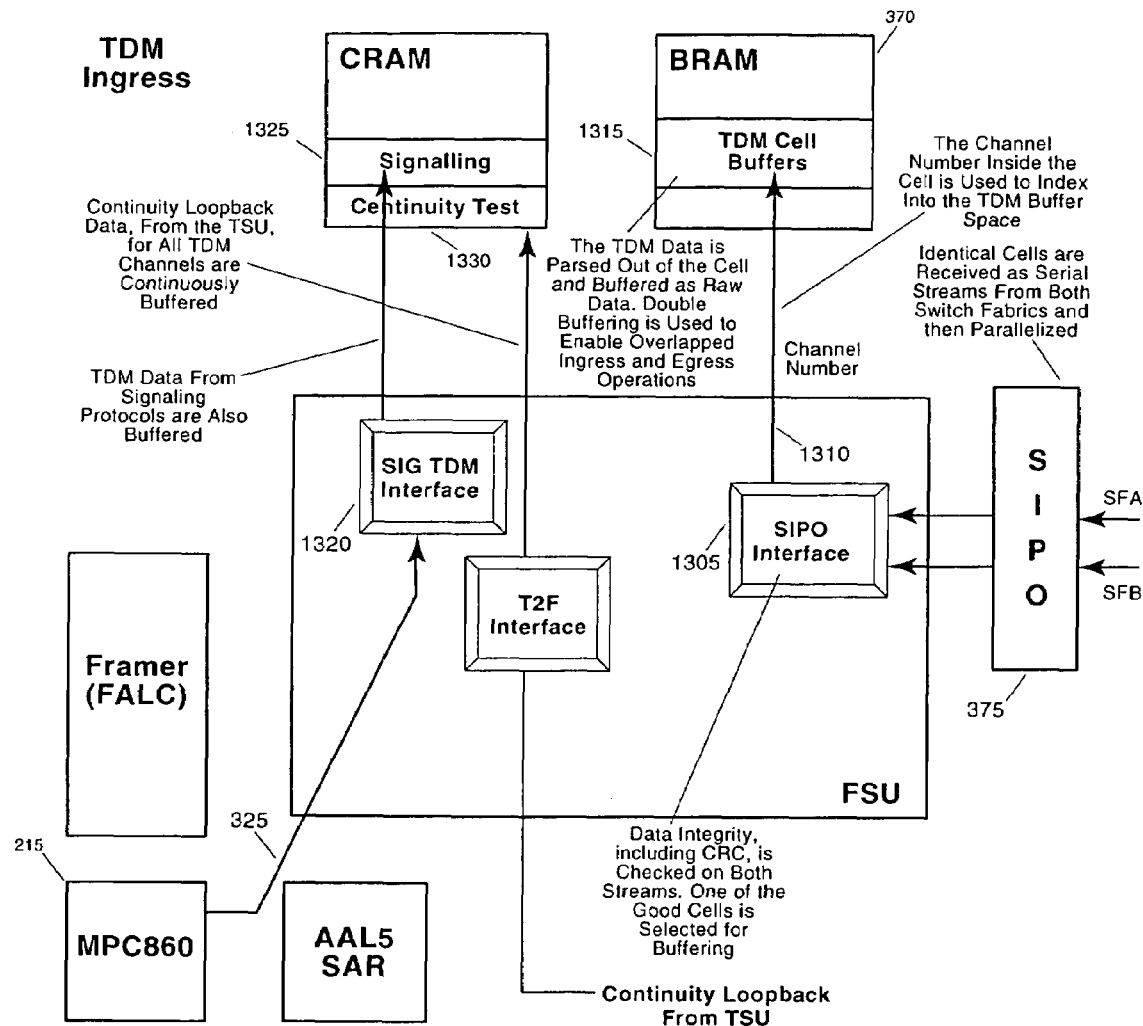
FIG. 13 shows the data flow for enqueuing cell data from the switch fabric into buffer RAM according to a preferred embodiment of the invention.

FIG. 13 illustrates the data flow of receiving cells from the switch fabric core. Cells are received by SIPO circuitry 375. SIPO interface 1305 receives the cell data in parallelized form from SIPO circuitry 375 and extracts a channel number 1310 from the cell data. The channel number is used as an index into buffer ram 370 to specific locations 1315 for TDM data.

FIG. 13 also illustrates the data flow for receiving signaling information from local processor 215. The signaling information is sent via link 325 to the signaling interface 1320 of FSU gate array 360. This information is then stored in signaling section 1325 of control ram 365. Loopback information from the TSU may be sent to continuity test section 1330 of control ram 365 via FSU gate array 360.

Figure 14:
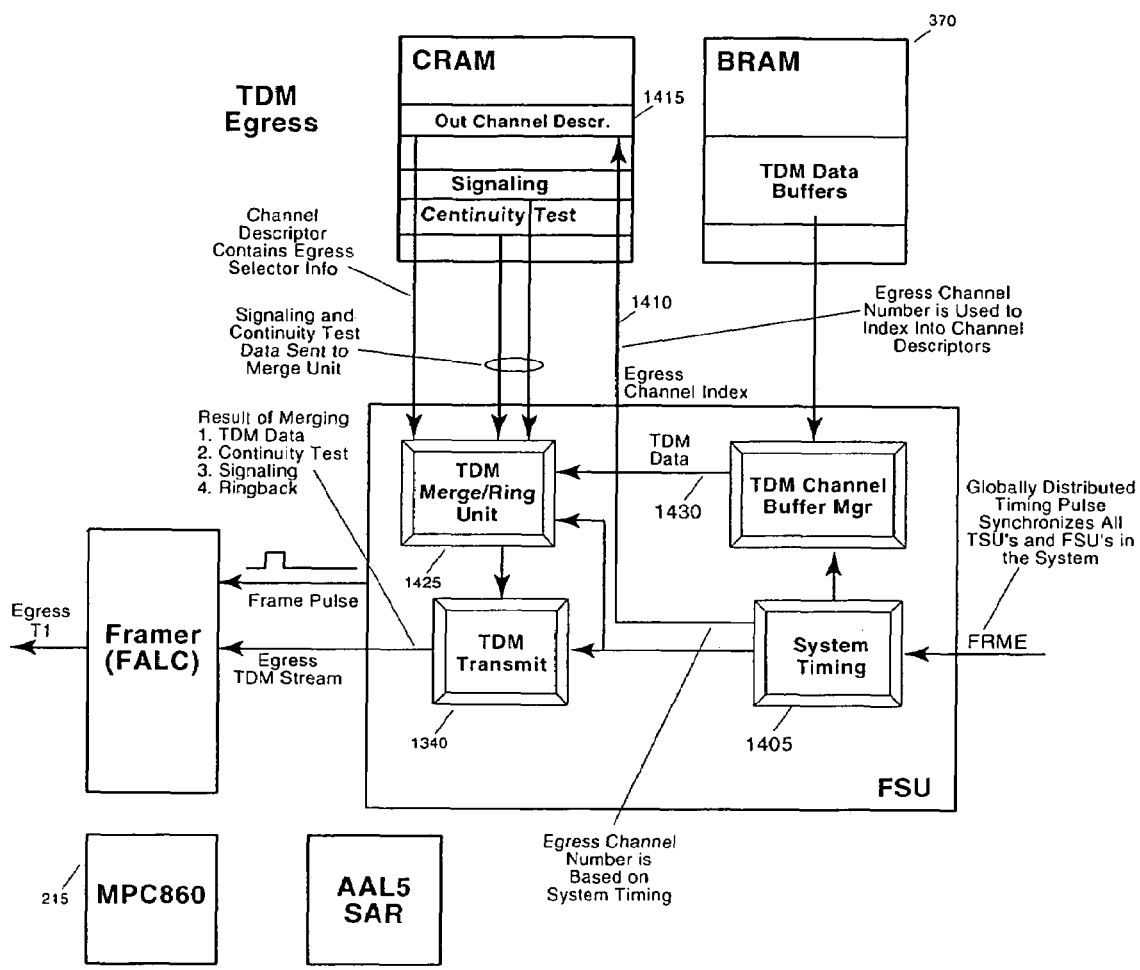
FIG. 14 shows the data flow for accessing circuit data from buffer RAM and sending the data to a circuit interface in accordance with a preferred embodiment of the invention.

FIG. 14 illustrates the data flow for transmitting circuit data from FSU 210. Egress (i.e., to communication links, such as T1, T3 or the like) channel number 1410 is determined by system timing logic 1405. The system timing may be controlled through globally distributed timing pulses to synchronize transfers. The channel number 1410 is used to index into the merge descriptor section 1415 of control ram 365. The merge descriptor selected contains egress selector information 1420 to indicate the source of the information to be merged. The egress selector information 1420 is received by TDM merge unit 1425. Merge unit 1425 also receives TDM data 1430 from the TDM channel buffer manager 1435, and it receives data from the signaling sections and continuity sections of control ram. As outlined above, the selector information will identify which of these sources should be selected. Under certain embodiments, the manager 1335 cycles through all circuits regardless of whether the channel is valid. The merge unit positions the TDM or other data in the correct time slot organization and sends it to TDM transmit interface 1340, which then sends the data via bus 112 to the transmit circuitry of the circuit interface 104.

Throughout the specification, reference was made to the term "frame." For example, all of the FPGAs operate synchronously with respect to each other and with respect to a TDM frame. Though the term is used to to refer to a time period corresponding to telecommunications frames, it is not intended to suggest that the time periods are phase aligned with the telecommunications frames. Indeed, the various communication links are expected to have frames of the same or similar frequencies but are not expected to be phase aligned and each will have their own frame boundary.

Within this specification, exemplary embodiments were described with reference to a core switching fabric that utilized fixed size ATM cells. The concepts and techniques however extend to packet based switching cores and in this sense the term "packet" is used more broadly than "cell." Packets involve payloads and headers, analogously to cells, but may have variable size.

Having described an exemplary embodiment, it should be apparent to persons of ordinary skill in the art that changes may be made to the embodiment described without departing from the spirit and scope of the invention.

What is claimed is:

1. A system for switching information in a time division multiplexed (TDM) communications network in which the TDM time slots correspond to channels of circuit information, comprising:
   a circuit interface including;
      logic to receive information from the TDM communication network, to extract circuit data therefrom, and to provide the extracted circuit data on an internal bus, and
      logic to receive circuit data from an internal bus and to transmit the data received from the internal bus on to the TDM communications network;
   a switching fabric for receiving packets having a header and a payload wherein the header includes information identifying a destination for the packet and wherein the fabric further transmits a received packet in accordance with the destination identification in the packet header;
   adaptation logic, responsive to the circuit interface, including;
      logic to pack information from multiple circuits into a payload of a packet,
      logic to provide channel numbers in the payload of the packet, wherein the channel numbers identify the channel on which the circuit data should eventually be transmitted,
      wherein the logic to pack information from multiple circuits into a payload and the logic to provide channel numbers are operable to cooperate to interleave circuit data and channel numbers in the payload by repeatedly providing two channel numbers followed by four bytes of information for each channel, in a total of eight channels,
         scheduling logic to schedule the delivery of a packet having a payload packed with information from multiple circuits,
      logic to receive packets from the switching fabric, and
      logic to extract circuit data from multiple packets onto an identified channel.

2. The system of claim 1 wherein each packet is a fixed size ATM cell.

3. The system of claim 1 wherein the scheduling logic is operable to ensure that for each scheduling time there is no contention for an identified destination.

4. The system of claim 3 wherein the identified destinations in a packet are port identifications, the scheduling logic includes a cell scheduling table accessed via an index having entries that specify the port to which a packet should be sent, and wherein for each index value the table entry specifies a port that is different than a port specified by another cell scheduling table.

5. The system of claim 1 wherein the logic to extract circuit data includes logic to access the payload of a received packet and to store circuit data therein in predefined locations in a random access memory (RAM) corresponding to a timeslot of the circuit data, and further including logic to iterate through said RAM in conjunction with the timing relationships of the circuits, to read the data from the RAM and to provide it to the channel.

6. The system of claim 5 wherein data may be written to one portion of the RAM while data may simultaneously be read from another portion of the RAM, and wherein after the data is written to the one portion and the data is read from the other portion, the one portion of the RAM is read from and the other is written to.

7. The system of claim 1 wherein the scheduling logic is further operable to ensure that for a scheduling time there is no contention for an identified destination.

8. The system of claim 7 wherein the identified destinations in a packet are port identifications, and
   wherein the scheduling logic includes a cell scheduling table accessed via an index having entries that specify a port to which a packet should be sent, where for each index value, a table entry specifies a port that is different than a port specified by another cell scheduling table.

9. A method of switching information in a time division multiplexed (TDM) communications network in which the TDM time slots correspond to channels of circuit information, comprising the steps of:
   receiving information from the TDM communication network;
   extracting circuit data therefrom,
   packing information from multiple circuits into a payload of a packet;
   providing channel numbers in the payload of the packet, wherein the channel numbers identify the channel on which the circuit data should eventually be transmitted,
   wherein the steps of packing information from multiple circuits into a payload and providing channel numbers interleaves circuit data and channel numbers in the payload by repeatedly providing two channel numbers followed by four bytes of information for each channel in a total of eight channels;
   scheduling the delivery of a packet, having a payload packed with information from multiple circuits, to a switching fabric that receives packets having a header and a payload wherein the header includes information identifying a destination for the packet and wherein the fabric transmits a received packet in accordance with the destination identification in the packet header;
   receiving packets from the switching fabric; and
   merging circuit data from multiple received packets onto an identified channel of the TDM communications network.

10. The method of claim 9 wherein each packet is a fixed size ATM cell.

11. The method of claim 9 wherein the step of scheduling ensures that for each scheduling time there is no contention for an identified destination.

12. The method of claim 11 wherein the identified destinations in a packet are port identifications, and wherein the step of scheduling is performed by accessing, with an index, a cell scheduling table having entries that specify the port to which a packet should be sent, where for each index value, a table entry specifies a port that is different than a port specified by another cell scheduling table.

13. A communication switch comprising:
adaptation logic, responsive to a circuit interface, including;
logic operable to pack information from multiple circuits into a payload of a packet;
logic operable to provide channel numbers in the payload of the packet, wherein the channel numbers identify the channel on which circuit data should eventually be transmitted,
wherein the logic to pack information from multiple circuits into a payload and the logic to provide channel numbers are operable to cooperate to interleave circuit data and channel numbers in the payload by repeatedly providing two channel numbers followed by four bytes of information for each channel in a total of eight channels;
scheduling logic to schedule the delivery of a packet having a payload packed with information from multiple circuits;
logic to receive packets from a switching fabric; and
logic to extract circuit data from multiple packets onto an identified channel.

14. The switch of claim 13 wherein each packet is a fixed size ATM cell.

15. The switch of claim 13 wherein the logic to extract circuit data includes logic operable to access the payload of a received packet and to store circuit data therein in predefined locations in a random access memory (RAM) corresponding to a timeslot of the circuit data, and further including logic operable to iterate through said RAM in conjunction with timing relationships of the circuits, to read the data from the RAM and to provide it to the channel.

16. The switch of claim 15 further operable to write data to one portion of the RAM while data is simultaneously read from another portion of the RAM, and, after the data is written to the one portion and the data is read from the other portion, reading from the one portion of the RAM and writing to the other.

17. A method for switching information in a time division multiplexed (TDM) communications network in which the TDM time slots correspond to channels of circuit information, the method comprising the steps of:
packing information from multiple circuits into a payload of a packet;
providing channel numbers in the payload of the packet, wherein the channel numbers identify the channel on which the circuit data should eventually be transmitted, wherein the steps of packing information from multiple circuits into a payload and providing channel numbers interleaves circuit data and channel numbers in the payload by repeatedly providing two channel numbers followed by four bytes of information for each channel in a total of eight channels;
scheduling the delivery of a packet having a payload packed with information from multiple circuits;
receiving packets from a switching fabric; and
extracting circuit data from multiple packets onto an identified channel.

18. The method of claim 17 wherein each packet is a fixed size ATM cell.

19. The method of claim 17 wherein the scheduling step ensures that for a scheduling time there is no contention for a specified destination.

20. The method of claim 19 wherein the identified destinations in a packet are port identifications, the step of scheduling further comprising accessing a cell scheduling table via an index having entries that specify the port to which a packet should be sent, where for each index value, the table entry specifies a port that is different than a port specified by another cell scheduling table.

21. The method of claim 17 wherein the extraction step further comprises accessing the payload of a received packet to store circuit data therein in predefined locations in a random access memory (RAM) corresponding to a timeslot of the circuit data, and iterating through said RAM in conjunction with timing relationships of circuits, to read data from the RAM and to provide the data to the channel.

22. The method of claim 21 further comprising the step of writing data to one portion of the RAM while data is simultaneously read from another portion of the RAM, and wherein after the data is written to the one portion of the RAM and the data is read from the other portion, reading from the one portion and writing to the other portion.

* * * * *